United States Patent
Nalla et al.

(10) Patent No.: US 8,601,036 B2
(45) Date of Patent: Dec. 3, 2013

(54) HANDLING PERSISTENT/LONG-LIVED OBJECTS TO REDUCE GARBAGE COLLECTION PAUSE TIMES

(75) Inventors: Vinod Nalla, Bangalore (IN); Harish K. Panda, Bangalore (IN); Pranavaditya Kannojoo, Bangalore (IN); Bipin N. Patil, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 13/069,614

(22) Filed: Mar. 23, 2011

(65) Prior Publication Data

US 2012/0246204 A1 Sep. 27, 2012

(51) Int. Cl.
*G06F 17/30* (2006.01)

(52) U.S. Cl.
USPC .................. 707/813; 707/814; 707/816

(58) Field of Classification Search
USPC .................................... 707/813, 814, 816
See application file for complete search history.

(56) References Cited

U.S. PATENT DOCUMENTS

| | | | |
|---|---|---|---|
| 5,799,324 A * | 8/1998 | McNutt et al. ................. | 1/1 |
| 5,873,105 A | 2/1999 | Tremblay et al. | |
| 6,098,089 A | 8/2000 | O'Connor et al. | |
| 6,565,403 B1 * | 5/2003 | Amey et al. ................... | 445/51 |
| 6,701,520 B1 * | 3/2004 | Santosuosso et al. ......... | 717/152 |
| 7,548,940 B2 | 6/2009 | Bacon et al. | |
| 7,672,983 B2 | 3/2010 | Printezis et al. | |
| 2002/0087590 A1 * | 7/2002 | Bacon et al. .................. | 707/206 |
| 2002/0099765 A1 * | 7/2002 | Otis ............................... | 709/203 |
| 2002/0107880 A1 * | 8/2002 | Bacon ........................... | 707/206 |
| 2005/0235120 A1 * | 10/2005 | Dussud ......................... | 711/159 |
| 2007/0276888 A1 * | 11/2007 | Klemm .......................... | 707/206 |
| 2009/0024679 A1 * | 1/2009 | Amundsen et al. ........... | 707/206 |
| 2012/0102289 A1 * | 4/2012 | Maram et al. ................. | 711/170 |

OTHER PUBLICATIONS

IBM, "GC For Large Heaps", Feb. 28, 2006, 2 pages.
T. Printezis, "Garbage Collection in the Java HotSpot Virtual Machine", Sep. 17, 2004, 7 pages.
IBM, IBM Developer Kit and Runtime Environment, Java 2 Technology Editiion, Version 1.4.2, Diagnostics Guide for z/OS64 and AMD64 platforms, Mar. 1, 2009, 7 pages.
B. Biron et al., "Real-time Java, Part 4: Real-time garbage collection", May 2, 2007, 15 pages.

* cited by examiner

*Primary Examiner* — Mahesh Dwivedi
(74) *Attorney, Agent, or Firm* — Walter W. Duft (57) ABSTRACT

A method, system and computer program product for reducing garbage collection pause time. According to example embodiments, a garbage collection cycle is initiated on a set of objects that have been dynamically allocated in a memory. An identification is made of new persistent objects and reachable non-persistent objects while ignoring old persistent objects that have been identified as persistent in previous garbage collection cycles. The new persistent objects are associated as members of a set of persistent objects that includes the old persistent objects. The persistence information for the set of persistent objects is preserved for use during subsequent garbage collection cycles. All reachable non-persistent objects and all persistent objects in the set of persistent objects are marked for memory reclamation phase processing. The persistent objects are so marked using the preserved persistence information such that repeated scanning of persistent objects during multiple garbage collection cycles is avoided.

17 Claims, 9 Drawing Sheets

HANDLING PERSISTENT/LONG-LIVED OBJECTS TO REDUCE GARBAGE COLLECTION PAUSE TIMES

BACKGROUND

1. Field

The present disclosure relates to computer systems and methods in which dynamically-allocated storage is periodically reclaimed to remove unused data objects. More particularly, this disclosure concerns improvements in automated heap memory reclamation, also known as garbage collection.

2. Description of Prior Art

By way of background, when a software program dynamically allocates heap memory for a data object, the object continues to "live" (as a valid object) as long as a reference to it (i.e., a pointer) exists somewhere in the active state of the program, such that the object is reachable via the reference. When an object ceases to be referenced from the active state and is no longer in use, it becomes "garbage." Garbage collection is an automated memory management operation that can be performed periodically to identify unused objects and reclaim their memory space.

Garbage collection (GC) is supported by various software programming languages, including Java® (registered trademark of Sun Microsystems Inc., hereinafter referred to as "Java"), $C^\#$, $C^+$ and C. One popular type of garbage collection uses a tracing algorithm known as "mark-sweep." According to this technique, a mark phase is first implemented wherein live/reachable objects in the heap are located and "marked" as being reachable. A sweep phase is then implemented in which all unmarked memory locations are reclaimed. During the mark phase, the garbage collector first performs a root scan of the program call stacks to identify stack variables that reference objects on the heap. Such objects are known as garbage collection "roots" (GC roots). The set of all GC root objects found by the root scan is known as a garbage collection root set (GC root set). The garbage collector also traverses all object sub-trees that emanate from the GC root objects to find additional non-root objects that are reachable from the root objects. All objects that are encountered during the root scan and sub-tree traversal operations are marked as being "in use" by setting a temporary mark flag. The mark flag may be implemented as a bit in a "mark bit array". During the sweep phase, the garbage collector uses the mark flags to note the memory locations of the marked objects, then sweeps the heap and finds all of the free space that can be reused. Compaction may thereafter be performed to consolidate the free space into contiguous regions of heap memory. All of the mark flags set during the mark phase of the current garbage collection cycle will be cleared prior to the mark phase of the next garbage collection cycle.

In some mark-sweep implementations, the root scan and sub-tree traversal operations performed during the mark phase are implemented using an iterative technique involving the use of a "mark stack." According to this technique, as each GC root object is encountered during the root scan, its mark flag is set and a reference to the root object is pushed onto a mark stack for deferred processing. Following root scanning, sub-tree traversal operations proceed by popping references off the mark stack. As each reference is popped, the object is inspected and any sub-tree object pointed to by the object is evaluated. The mark flag for the sub-tree object is set, and a reference thereto is pushed onto the mark stack. The mark stack will then be processed in the same fashion. Such operations will repeat until all of the reachable sub-tree objects have been identified for all the root objects.

As the cost of memory continues to drop, applications are running with infrastructures having increasing amounts of physical memory. This enables developers to write applications that maintain most of their data objects in main memory rather than saving the data in file systems. Such objects will often be referred throughout the lifetime of the application. In-memory databases that use in-memory tables for faster transaction processing are one example.

Garbage collection has an associated overhead, referred to as pause time, that delays the operation of concurrently executing applications. Garbage collection pause times tend to grow with heap size, which can affect the scalability of applications that maintain large amounts of live in-memory data. Moreover, garbage collection can incur unnecessary overhead when there are a large number of persistent objects insofar as such objects are rarely discarded. Because persistent objects may persist indefinitely (sometimes for the life of an application), the overhead associated with scanning such objects is largely wasted effort.

To address this concern, some garbage collectors use strategies that process short-lived objects differently than long-lived objects. For example, generational garbage collection divides heap memory into two or more regions that segregate objects by generation, then focuses garbage collection on the younger generation region(s) where unused objects are more likely to be found. This mechanism incurs the overhead associated with copying long-lived objects multiple times between regions. Moreover, because generational garbage collection is heuristic in nature, it does not reclaim all memory associated with unused objects during every cycle, which means that global mark-and-sweep garbage collection needs to be performed periodically. These global mark-and-sweep garbage collection cycles still face the overhead of repeated processing of persistent objects.

The Metronome garbage collector in IBM® Websphere® products uses another garbage collection strategy that allocates persistent objects in a separate memory area. However, the garbage collector cannot identify persistent objects by itself and relies on users to specify such objects through an API (application program interface). Moreover, once an object is identified as persistent, it remains so forever. If the object is released at some point, its memory will not be reclaimed unless the garbage collector is specifically advised.

SUMMARY

A method, system and computer program product for reducing garbage collection pause time. According to example embodiments, a garbage collection cycle is initiated on a set of objects that have been dynamically allocated in a memory. An identification is made of new persistent objects and reachable non-persistent objects while ignoring old persistent objects that have been identified as persistent in previous garbage collection cycles. The new persistent objects are associated as members of a set of persistent objects that includes the old persistent objects. The persistence information for the set of persistent objects is preserved for use during subsequent garbage collection cycles. All reachable non-persistent objects and all persistent objects in the set of persistent objects are marked for memory reclamation phase processing. The persistent objects are so marked using the preserved persistence information such that repeated scanning of persistent objects during multiple garbage collection cycles is avoided.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Introduction

The present disclosure describes a technique that identifies persistent objects in heap memory at run time, and provides an efficient way for garbage collection to handle such objects. For applications that persist large amounts of in-memory data in heap storage, this can significantly reduce garbage collection pause times and allows better scalability.

As used herein, a persistent object may be considered to be an object that lives for a specified duration and survives a specified number of garbage collection (GC) cycles. Listed below are several categories of objects that may be treated as persistent:

1) If an object lives forever during the life of an application, it may be defined as persistent. Such objects will survive all GC cycles.
2) If an object lives for a longer time in comparison with GC frequency, then the object may be defined as persistent for at least a few GC cycles.
3) If an object is persistent by any of the above two definitions, the objects referenced by such object may also considered to be persistent. In another words, if an object is persistent, all of its children may be considered as persistent.
4) If an object is referred from two or more persistent objects, the degree of persistence for the object may be considered to be higher. The higher the degree of persistence, the higher will be the chance of that object staying alive on the heap.

Overview of Disclosed Technique

Figure 1:
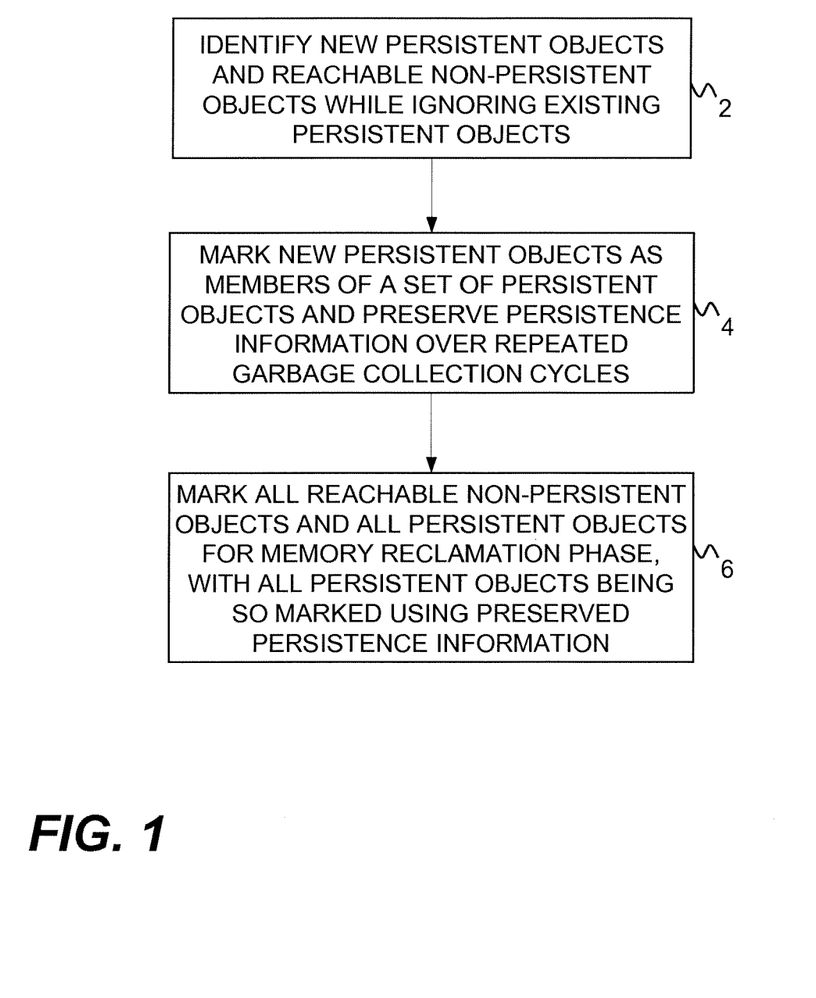
FIG. 1 is a flow diagram showing example garbage collection operations that may be performed in accordance with the present disclosure.

Turning now to FIG. 1, a garbage collection technique that handles persistent objects while reducing garbage collection pause times may be implemented using the generalized operations shown in blocks 2, 4 and 6. In block 2, new persistent objects and reachable non-persistent objects are identified while old persistent objects that were identified during previous garbage collection cycles are ignored. In block 4, the new persistent objects are marked as being members of a set of persistent objects that also includes the old previously identified persistent objects. The persistence information for all identified persistent objects is preserved over repeated garbage collection cycles. In block 6, all reachable non-persistent objects and all persistent objects are marked as being in-use in order to preserve such objects during the memory reclamation phase. All persistent objects are so marked using the preserved persistence information.

The operations of blocks 2-6 of FIG. 1 may be performed in various ways. According to an example embodiment described in more detail below, the illustrated operations are implemented using a modified form of mark-phase garbage collection. Instead of blindly searching for all reachable objects during every garbage collection cycle (as in conventional mark-phase processing), the modified mark-phase operations intelligently skip over objects that have been previously identified as persistent and searches only for reachable non-persistent objects and new persistent objects that have become persistent since the last garbage collection cycle.

Initially, a root scan of the program call stacks is performed. A stack frame (and all objects that are reachable therefrom) is deemed to be persistent if it has survived for some threshold number of epochs (time intervals). Stack frames that were found to be persistent during previous garbage collection cycles are ignored. For stack frames that have become newly persistent as of the current garbage collection cycle, all GC root objects and all reachable sub-tree objects associated with such frames are identified and marked as being persistent. This marking operation does not involve the temporary mark flag that is repeatedly set and cleared in a mark bit array, as per conventional mark-sweep garbage collection. Instead, newly persistent objects are marked by setting a long-lived persistence indicator that survives multiple garbage collection cycles. In example embodiments, this is handled by incrementing a bit in a persistence bit array. If desired, several persistence bits may be allocated to each persistent object so that objects with multiple references can be identified using a persistence count. The persistence bit array identifies all persistent objects that have been identified through the current garbage collection cycle.

For stack frames that are found to be non-persistent during the current garbage collection cycle, all non-persistent GC root objects and all reachable non-persistent sub-tree objects associated with such frames are identified and marked in a conventional mark bit array for subsequent sweep-phase processing. In addition, the mark bit array is populated using the persistence bit array so that all persistent objects identified over the course of plural garbage collection cycles are accounted for during the sweep-phase. Instead of repeatedly scanning persistent objects during each garbage collection cycle in order to populate the mark bit array, persistent objects can be added thereto by simply copying information from the persistence bit array. In this way, each garbage collection cycle only needs to perform object searching to process new persistent objects into the persistence bit array and non-persistent objects into the mark bit array. This should significantly reduce garbage collection pause times in environments having an abundance of persistent objects.

Example Embodiment

Figure 2:
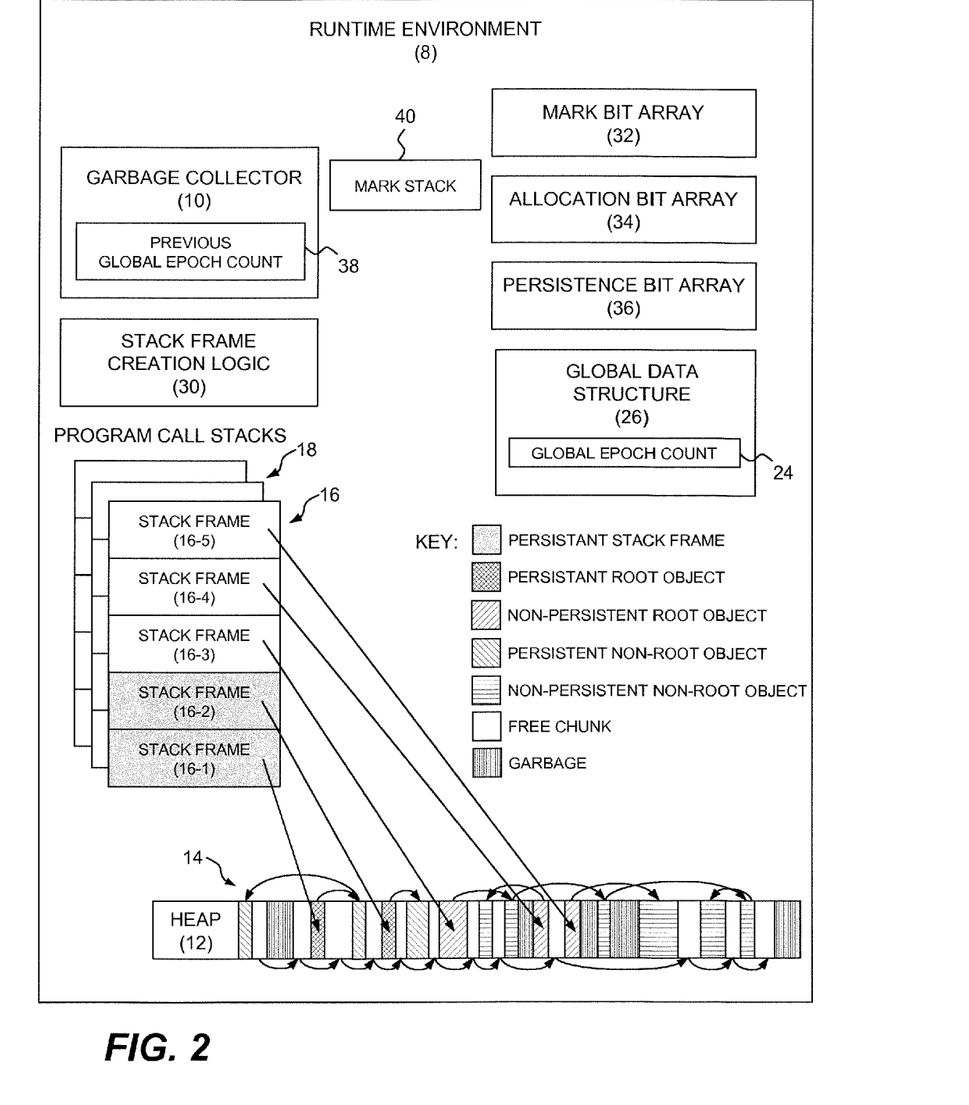
FIG. 2 is a functional block diagram showing an example computer runtime environment in which garbage collection is implemented in a manner that handles persistent objects.

Turning now to FIG. 2, an example computer runtime environment 8 is shown wherein a garbage collector 10 performs garbage collection on a heap memory 12 that contains plural objects 14. By way of example only, the runtime environment 8 could be implemented as a Java Virtual Machine (JVM) and the garbage collector 10 could be a Java garbage collector. It should be noted, however, that the present disclosure is not limited to Java runtime environments. Other runtime environments, real or virtual, could also be used.

The garbage collector 10 initiates object persistence identification by first determining the persistence of GC root objects. Insofar as GC root objects are largely referenced from call stack frames, persistent root objects may be found by considering the persistence of the stack frames on which they reside. Thus, in the embodiment of FIG. 2, object persistence identification begins with the garbage collector 10 scanning through the stack frames 16 of a set of program call stacks 18 to identify newly persistent stack frames. For purposes of illustration, the stack frames 16-1 and 16-1 in FIG. 2 are assumed to be persistent. The color-code key in FIG. 2 indicates the nature of the various objects 14 in the heap 12.

Figure 3:
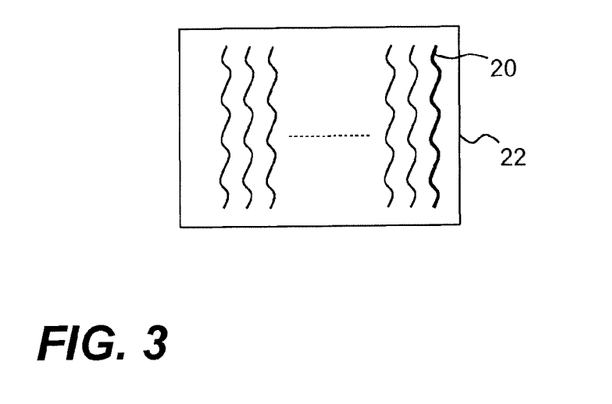
FIG. 3 is a functional block diagram showing an example multi-thread process that includes an epoch thread for generating epochs for use in tracking the age of objects.

As used herein, a newly persistent stack frame is a frame that has aged beyond some persistence threshold since the immediately preceding garbage collection cycle. One technique that may be used to measure call stack frame age is to maintain a record of each stack frame's creation time. For example, a count of epochs can be maintained for time tracking purposes and an epoch count value may be assigned to each stack frame at the time of its creation. Epochs can be generated at regular intervals of time by a specialized epoch counting thread. FIG. 3 illustrates an example epoch thread 20 running in a multi-thread process 22, such as a Java Virtual Machine (JVM) process running plural JVM threads. It will be appreciated that the epoch thread 20 could run in other execution contexts in other software environments. For example, it could be a process rather a thread.

Returning now to FIG. 2, a global epoch count field 24 that holds the current epoch count ($T_{epochgc}$) may be added to a global data structure 26 that is accessible to the garbage collector 10. The epoch thread 20 will update the value of $T_{epochgc}$ in the global epoch count field 24 after each epoch. Note that the global epoch count field 24 will have very minimal effect on the size of the data structure 26 insofar as a field of integer/long should be sufficient to keep track of a long running enterprise application. For example, if the time interval of one epoch is 500 milliseconds (Tepoch=500 ms), and if an unsigned integer is be used to store the epoch count, the epoch count can be incremented until 4294967296 epochs, which totals approximately 596523.2 Hours=24,855 days=67 years.

Figure 4:
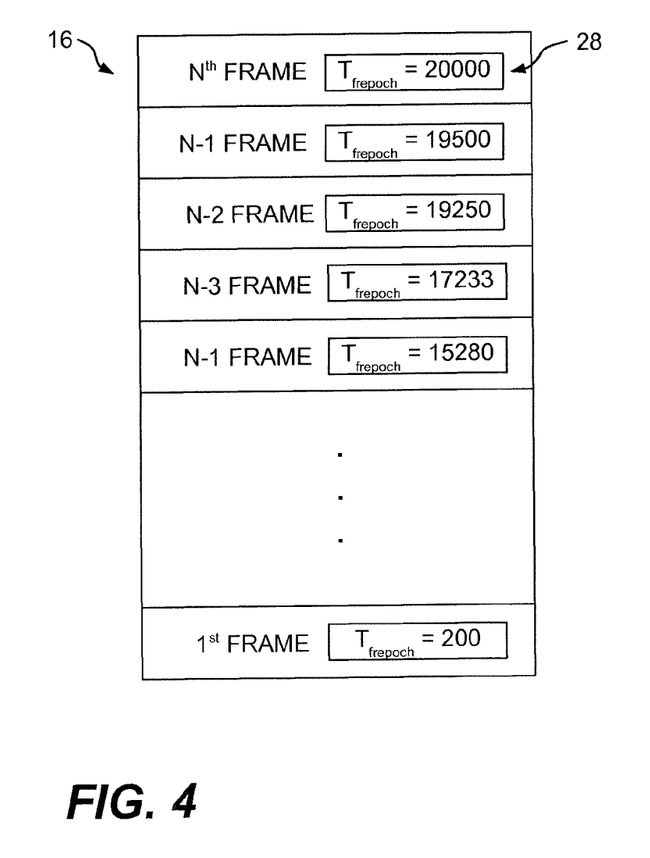
FIG. 4 is a functional block diagram showing epoch counts stored in a set of stack frames.

Turning now to FIG. 4, a per-frame epoch count field 28 may be added to the structure of each stack frame 16 to store the epoch that existed at the start of frame creation ($T_{frepoch}$). Stack frames are created in the computing environment 8 of FIG. 2 by stack frame creation logic 30. In a Java runtime environment, this logic may be implemented by the JVM. When a new stack frame 16 gets created, the frame creation logic 30 will read the current epoch count $T_{epochgc}$ from the global epoch count field 24 and copy the epoch count value to the per-frame epoch count field 28 of the new frame. In a Java runtime environment, Java objects can be referenced from Java thread stack frames, JIT (Just In Time) compiler stack frames, JNI (Java Native Interface) native method stack frames. In the case of a Java method stack frame or a JNI native method stack frame, the frame creation logic 30 may store the current epoch value in the stack frame structure by defining an additional field to represent the per-frame epoch count field 28. In the case of a JIT compiler stack frame, the per-frame epoch count field 28 may be added at a specific offset in the stack frame at the time of method compilation.

The epoch count stored in the per-frame epoch count field 28 is used by the garbage collector 10 to determine the age of a stack frame. The difference between the current epoch count and the epoch count stored in the stack frame will give the frame's relative age. As discussed by way of introduction above, a "persistent frame" is a stack frame that has a high relative age. The garbage collector 10, retrieves the global epoch count $T_{epochgc}$ at the time of root scanning from the global epoch count field 24. A stack frame is considered to be a persistent frame when the difference between the current epoch count $T_{epochgc}$ and frame's time-of-creation epoch count $T_{frepoch}$ is greater than a fixed epoch threshold value ($T_{threshold}$), which may be referred to as a persistence threshold. This given by expression (1) below:

$$T_{epochgc} - T_{frepoch} > T_{threshold} \rightarrow \quad (\text{Expr 1})$$

Figure 5:
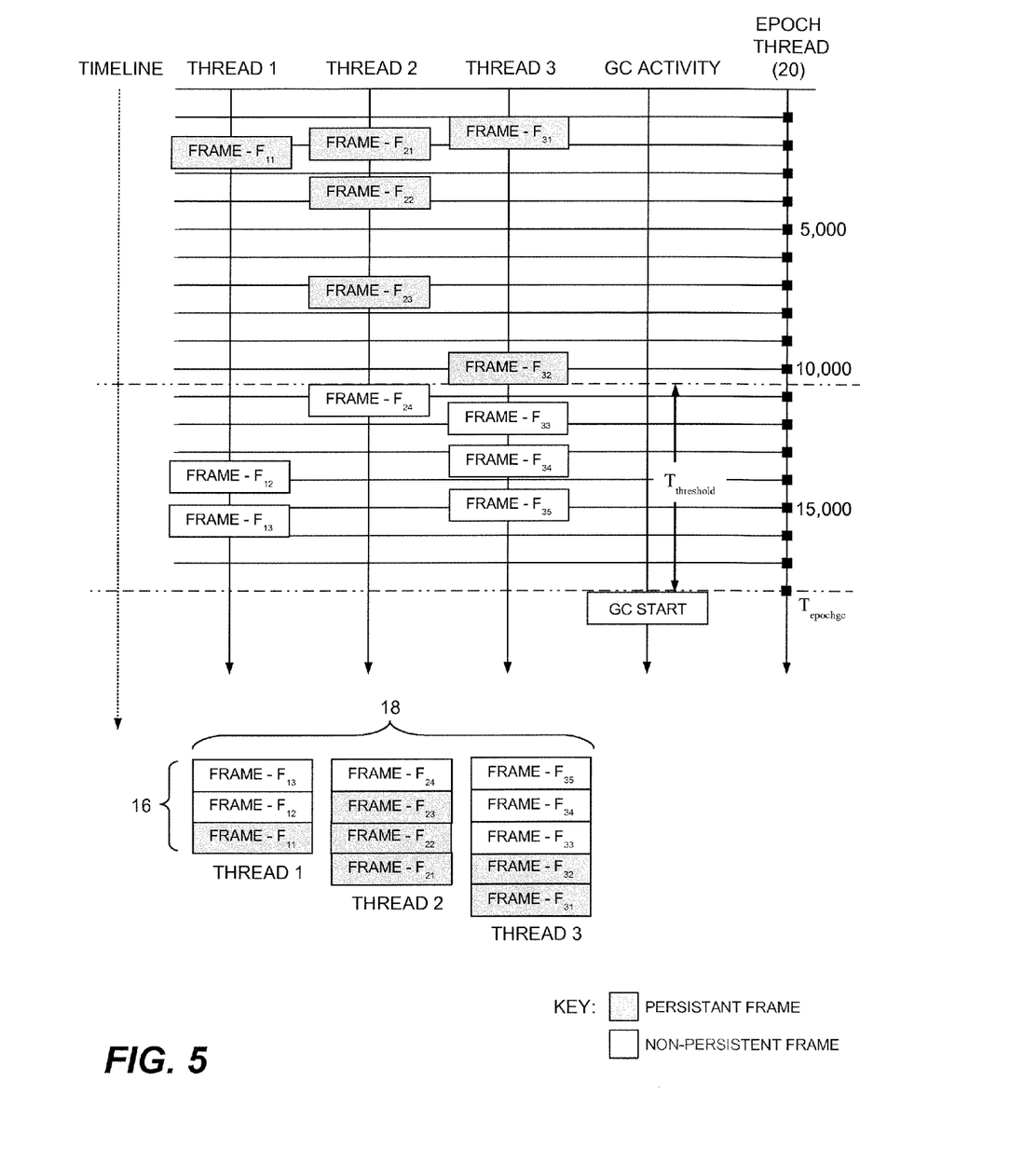
FIG. 5 is a timing diagram showing the use of an epoch count threshold value to identify persistent stack frames associated with various application threads during garbage collection.

FIG. 5 illustrates an example timeline explaining the identification of persistent stack frames. The threads named "Thread 1", "Thread 2" and "Thread 3" are example application threads (or processes) executing methods or functions. For example, the illustrated threads could be Java application threads executing Java methods. The epoch thread 20 (see FIG. 3) generates epochs. Garbage collection (GC) activity is also illustrated. FIG. 5 additionally shows the current call stacks 18 of the application threads. The stack frames 16 are identified with indices of the form $Frame_{mn}$, where 'n' represents the 'nth' frame of Thread 'm.' In the timeline portion of FIG. 5, the stack frames 16 are positioned at the epoch that existed at their time-of-creation.

When a garbage collection cycle is initiated, all stack frames satisfying expression (1) above are considered to be persistent frames. The $T_{threshold}$ value can be defaulted to a value set by the garbage collector 10 (FIG. 2). It could also be configured by a user. The higher the $T_{threshold}$ value, the longer it will take for objects to be considered as persistent objects. Tuning the $T_{threshold}$ value helps the garbage collector 10 persist the right set of objects, which helps in achieving optimal performance of application while minimizing the residual garbage.

Figure 6:
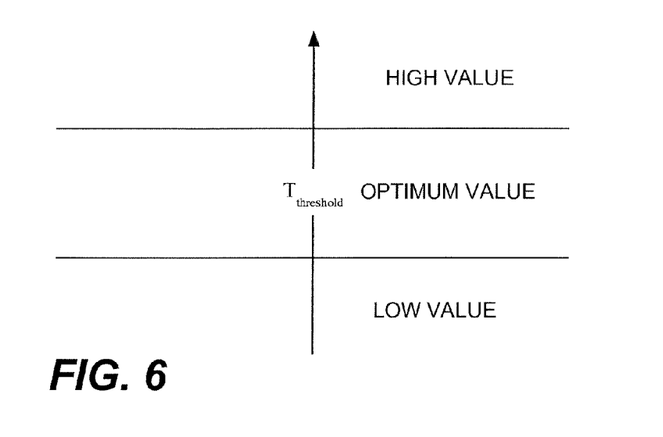
FIG. 6 is a diagram showing the effects of an epoch count threshold value on garbage collection performance.

FIG. 6 illustrates the effect of the $T_{threshold}$ value on garbage collection performance and heap size. If $T_{threshold}$ is set to a high value, fewer objects will be designated persistent and more objects will be scanned during each garbage collection cycle. A point may be reached at which garbage collection performance does not improve. If $T_{threshold}$ is set to a low value, more objects will be designated persistent and fewer objects will be scanned during each garbage collection cycle. This improves garbage collection performance but a point may be reached when the size of the heap 12 grows too large.

Figure 7:
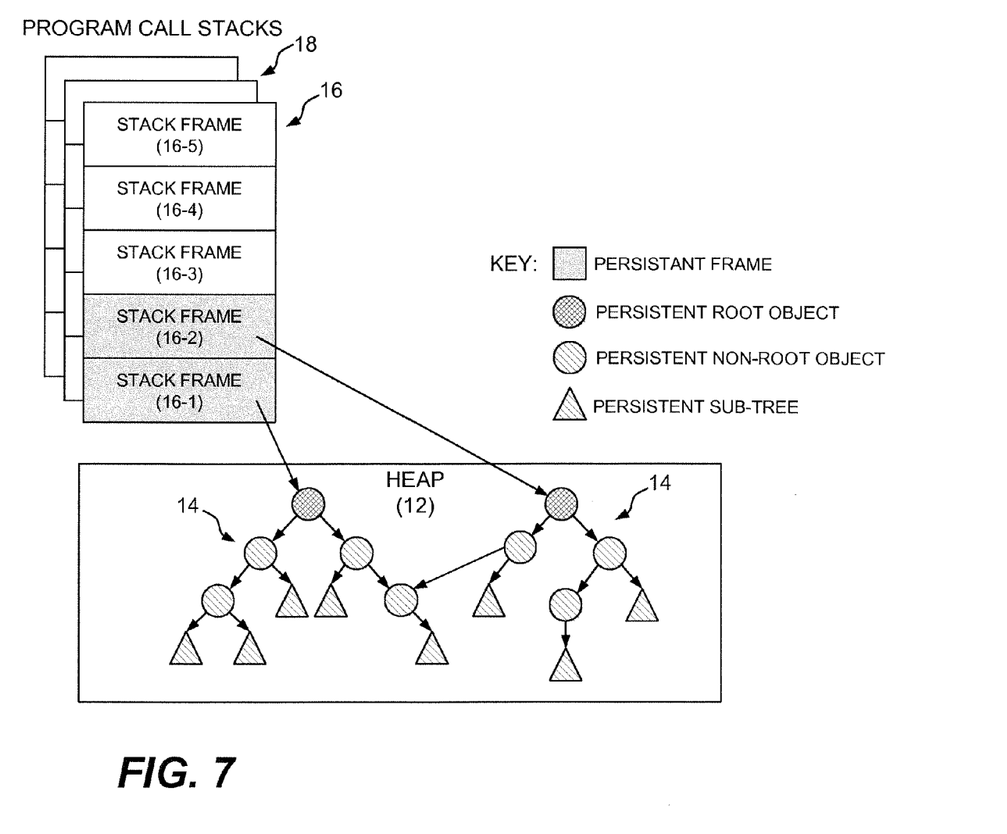
FIG. 7 is a functional block diagram showing persistent root objects and persistent non-root sub-tree objects.

Turning now to FIG. 7, persistent stack frames 16 identified in the foregoing manner are used to identify persistent root objects and all persistent non-root sub-tree objects that are reachable therefrom. The garbage collector 10 presumes that all object sub-trees emanating from persistent root objects are persistent objects. The garbage collector 10 skips repeated marking of previously identified persistent objects during subsequent garbage collection cycles, resulting in performance improvement in the garbage collection mark phase. In addition, the runtime environment 8 (FIG. 2) can monitor any objects that applications add to or remove from the persistence sub-trees in order to change the persistence level of the sub-tree objects. This is described in more detail below in connection with FIG. 12.

The presumption of considering all objects in sub-tree of persistent roots as also being persistent objects is pragmatic, even though it may lead to incorrectly considering a few short-lived objects to be persistent. To address this issue, the garbage collector 10 can occasionally trigger a full garbage collection cycle that traverses even the persistent roots in order to collect such short lived objects. For example, this may be done when memory conditions require aggressive reclamation. This type of full garbage collection cycle may be referred to as persistent garbage collection. Thus, although considering an entire sub-tree as persistent increases the residual garbage in the java heap, it should provide a performance benefit and memory can be reclaimed during a low memory condition using persistent garbage collection.

As described by way of background above, a mark-sweep garbage collector may use an array bit to indicate a live object existing at a specific memory location in the heap. Each such bit corresponds to some amount of memory in the heap 12 that can vary depending on the object layout (e.g., four bits for 32 bit architectures, eight bytes for 64 bit architectures, etc). A conventional mark-sweep garbage collector may use two such array bits, one of which is a mark bit in a mark bit array (used for sweep-phase processing) and the other being an allocation bit in an allocation bit array (used for memory space compaction following sweep-phase processing). The runtime environment 8 of FIG. 2 includes a mark bit array 32 and an allocation bit array 34. The garbage collector 10 of the present embodiment also utilizes a third array, namely, a persistence bit array 36 (see FIG. 2). The persistence bit array 36 has bits set for only the persistent objects existing in the heap 12. Unlike a conventional mark bit array, the contents of the persistence bit array 36 are not reset for each garbage collection cycle. As such, if an object and its sub-tree objects are identified as persistent in the persistence bit array 36 in one garbage collection cycle, the persistence bit array will prevent that object and it's sub-tree objects from being traversed during subsequent garbage collection cycles, at least until the objects becomes non-persistent or until persistent-garbage collection is performed. The persistence bit array 36 identifies the set of all persistent objects that have been discovered through the current garbage collection cycle.

Figure 8:
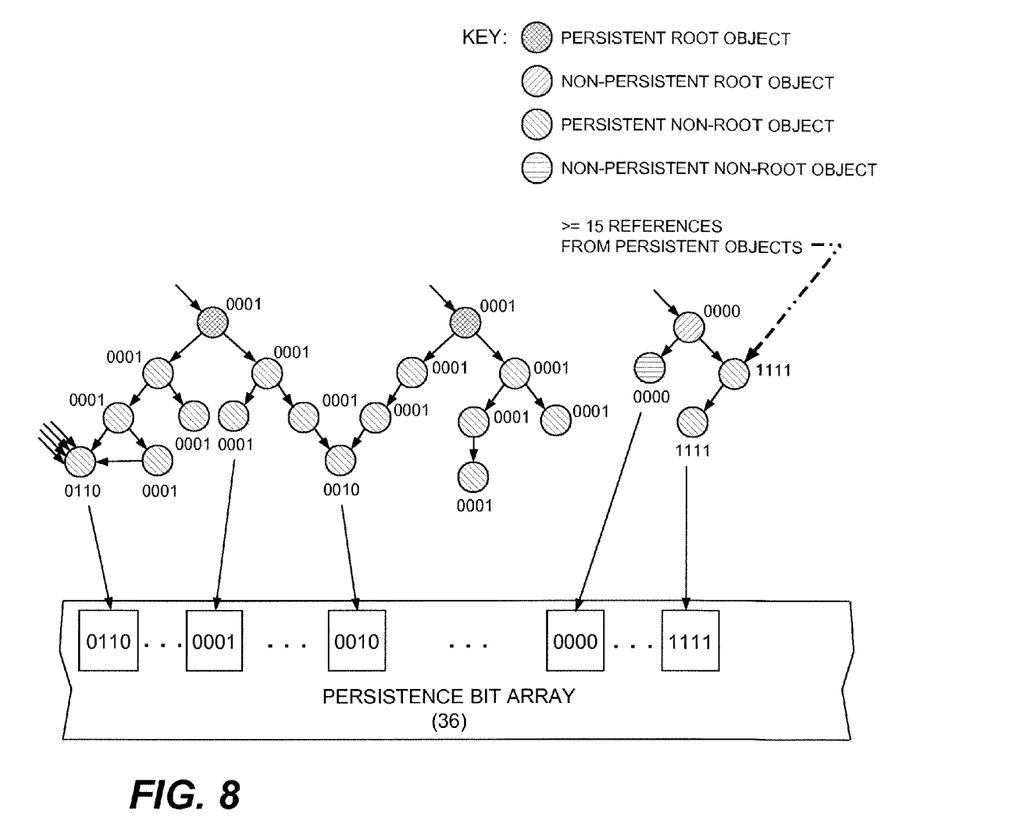
FIG. 8 is a functional block diagram showing the use of a persistence bit array to identify persistent objects.

According to the embodiment of FIG. 2, the persistence bit array 36 maintains a count of persistent references to each persistent object (from persistent roots or other non-root persistent objects). The garbage collector 10 can use this information to make a determination regarding an object's level of persistence and to effectively collect the object once it loses all of its persistent references. By way of example, FIG. 8 illustrates that the persistence bit array 36 may use four persistence bits for each persistent object. These bits indicate the number of persistence references to each persistent object. The number of persistent bits per object can also be designed to be user configurable. This will add the flexibility to maintain more levels of persistence, albeit with higher memory overhead. Assuming a heap size of 128M, four bits of persistence array associated for each object, and each object representing 8 bytes of heap memory, a 32 bit system we would need to allocate 16M for the persistence bit array 36.

As described by way of overview above, the persistence bit array 36 is populated using a modified mark-phase operation. New persistent stack frames and their persistent root objects are identified during root scanning The object sub-trees are then traversed to identify all persistent non-root objects that are reachable from the persistent root objects. All such new persistent objects are marked in the persistence bit array 36. As also previously mentioned, the mark-phase root scan bypasses old persistent stack frames that were discovered during previous garbage collection cycles. Non-persistent stack frames are processed in normal fashion. Each such frame's non-persistent root objects are identified during root scanning The object sub-trees are then traversed to identify all non-persistent non-root objects that are reachable from the non-persistent root objects. All such non-persistent objects are marked in the mark bit array 32. All persistent objects are accounted for in the mark bit array 32 by incorporating information from the persistence bit array 36.

A technique for distinguishing between persistent and non-persistent stack frames 16 was described above in connection with FIG. 5. In particular, the garbage collector 10 considers a stack frame 16 to be persistent when the difference between the current epoch count $T_{epochge}$ (stored in the global epoch count field 24) and frame's time-of-creation epoch count $T_{frepoch}$ (stored in the per-frame epoch count field 28) is greater than a fixed epoch threshold Tthreshold, as per expression (1) give above. The new persistent frame identification operation performed by the garbage collector 10 skips persistent stack frames already scanned in previous garbage collection cycles because their persistent objects have already been identified and added to the persistence bit array 36. Only stack frames 16 that have become persistent since the last garbage collection are of interest. In order to identify such new persistent stack frames, the garbage collector 10 stores the epoch count $T_{epochgc}$ of the previous garbage collection cycle ($T_{epochlastge}$)(in a previous global epoch count field 38 (see FIG. 2)). The garbage collector 10 uses the $T_{epochlastgc}$ value when scanning through the program call stacks 18 to determine if any stack frame 16 was not persistent until the last garbage collection cycle. This condition is given by expression (2) set forth below:

$$T_{epochlastgc} - T_{frepoch} < T_{tlueshold} > \quad \text{(Expr 2)}$$

Note that expression (1) and expression (2) can be combined to give a third expression (3), as follows:

$$T_{epochgc} > T_{threshold} + T_{frepoch} > T_{epochlastgc} \rightarrow \quad \text{(Expr 3)}$$

By using expression (3), the garbage collector 10 can easily distinguish between old persistent frames, new persistent frames and non-persistent frames at the beginning of mark-phase processing. However for the first garbage collection cycle, the garbage collector 10 may need to use expression (1).

The scanning and marking of persistent objects and non-persistent objects may be handled in separate operations, with persistent objects being processed first. New persistent frames are identified during a persistent object root scan. As each new persistent stack frame 16 is identified, its persistent root objects are identified and marked in the persistence bit array 36 to associate such root objects as members of the set of all persistent objects discovered through the current garbage collection cycle. If desired, a mark stack may be used to defer the marking of persistent non-root objects in the persistence bit array 36 until the persistent object root scan has completed. As described by way of background above, the use of mark stacks is a technique employed by some conventional mark-sweep garbage collectors to populate their mark bit arrays. The same approach may be used for persistent object identification and marking, except that it is the persistence bit array 36 that is updated rather than the mark bit array 32. In this way, persistent non-root objects will also be associated with the set of all persistent objects discovered through the current garbage collection cycle. FIG. 2 illustrates a mark stack 40 that may be used for the deferred marking of persistent non-root objects in the persistence bit array 36. Other data structure types could also be used depending on implementation and performance requirements. During persistent deferred marking, the sub-trees emanating from all newly identified persistent root objects are traversed and the persistence values of the persistent non-root objects in those sub-trees are incremented in the persistence bit array 36.

During the identification and marking of persistent objects, if it is found that a persistent object is already referenced from another persistent object, the persistence count of the referenced persistent object is increased in the persistence bit array 36. As described above, four bits may be associated with each persistent object, which allows for setting a maximum persistence count value of 31. If a persistent object is already referenced from more than 31 persistent objects, its count value in the persistence bit array 36 is not incremented and further modification of its persistence bits is skipped. These objects will not likely be touched until the next time persistent garbage collection is performed.

The garbage collector 10 populates the mark bit array 32 based on the values in the persistence bit array 36. This sets the mark bits for all persistent objects that have been identified over the course of multiple garbage collection cycles in a single copy operation, thereby saving a significant amount of object marking and traversing time. A non-persistent root scan operation is also performed to identify non-persistent root objects and a deferred operation may be used to identify non-persistent non-root objects. The mark stack 40 may be used for the latter operation, as is conventional.

The setting of mark bits in the mark bit array 32 using previously-generated persistence bits need not search through each and every word of the persistence bit array 36. The garbage collector 10 can continuously skip all of the consecutive zero words and stop only at non-zero words. Once a non-zero value is found in the persistence bit array 36, the corresponding mark bit is set in the mark bit array 32. For large heaps where the persistence bit array 36 is large, a parallel algorithm may be used to transfer information from the persistence bit array 36 to mark bit array 32. This copy operation will be very minute when compared to the conventional alternative of tracing all persistent objects during every garbage collection cycle. As stated, once the mark bit array 32 is populated with information from the persistence bit array 36, the processing of non-root objects may be performed in conventional fashion to set the mark bits of non-persistent root objects and non-persistent non-root objects.

Figure 9:
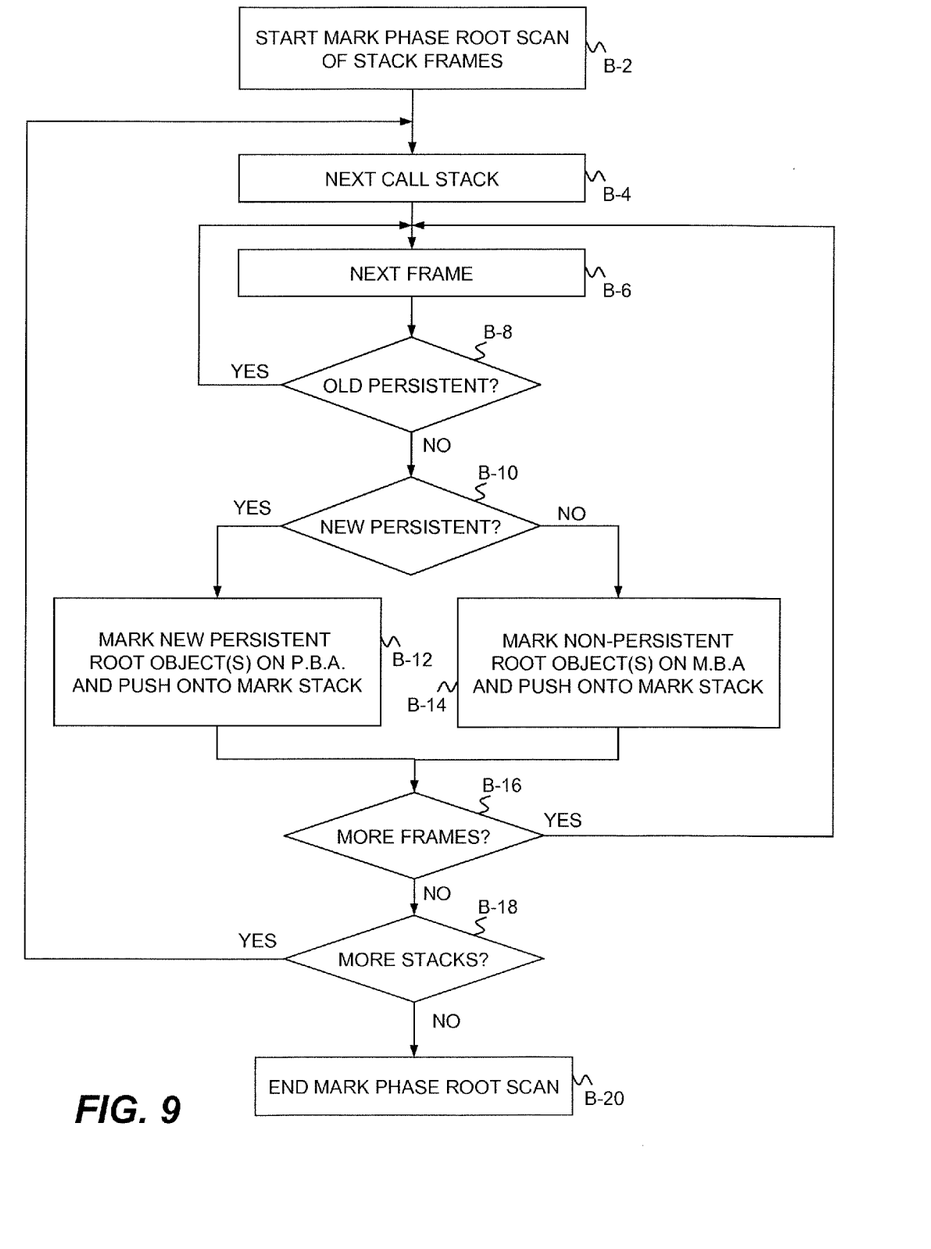
FIG. 9 is a flow diagram showing example garbage collection root scan processing.
Figure 10:
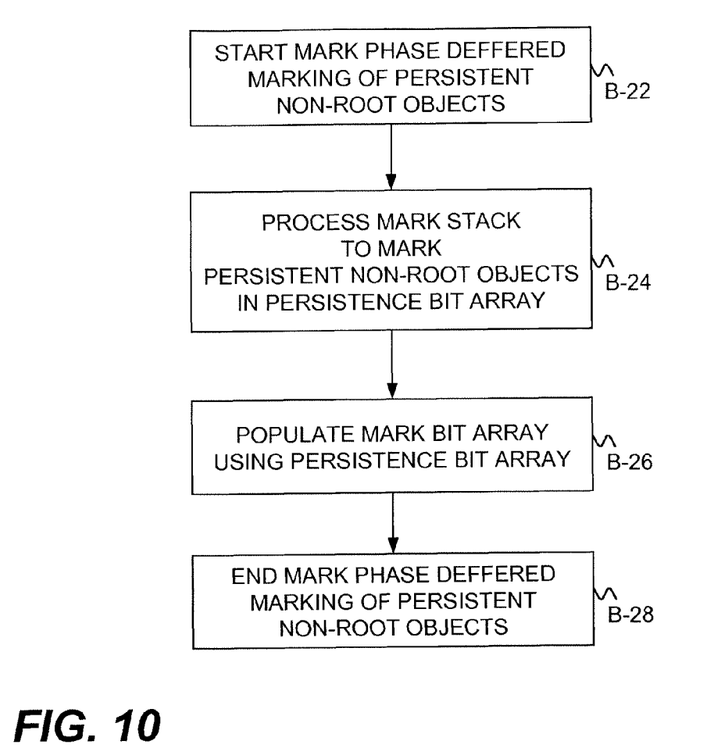
FIG. 10 is a flow diagram showing example garbage collection deferred marking of persistent non-root objects.
Figure 11:
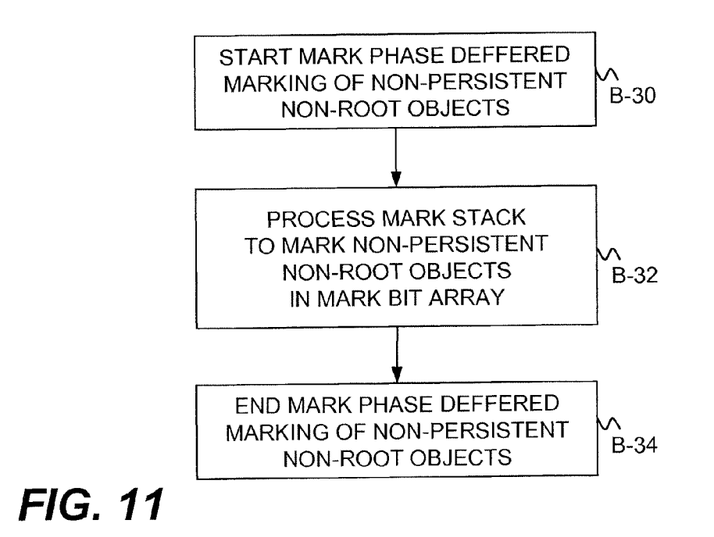
FIG. 11 is a flow diagram showing example garbage collection deferred marking of non-persistent non-root objects.

FIGS. 9-11 illustrate the root scan and deferred marking operations described above. Root scanning begins at block B-2 of FIG. 9. Blocks B-4 and B-6 set up loops for iteratively inspecting each stack frame of each program call stack. In block B-8, old persistent stack frames that were determined to be persistent in previous garbage collection cycles are skipped over. In block B-10, newly persistent stack frames are distinguished from non-persistent stack frames. For newly persistent stack frames identified during the persistent object root scan operation, block B-12 marks the frame's persistent root objects in the persistence bit array (P.B.A) and pushes references to such objects onto the mark stack 40. For non-persistent stack frames identified during the non-persistent object root scan operation, block B-14 marks the frame's non-persistent root objects in the mark bit array (M.B.A) and pushes references to such objects onto one of the mark stack 40. Blocks B-16 and B-18 iterate on blocks B-8 through B-14 until all call stacks have been evaluated, then root scan processing terminates in block B-20.

Deferred marking of persistent non-root objects begins at block B-22 in FIG. 10. Block B-24 processes the mark stack 40 to mark all persistent non-root objects that are reachable from root objects. As previously stated, persistent non-root objects are marked in the persistence bit array 36. At this point, all persistent objects will have been marked in the persistence bit array 36. In order to prepare for non-persistent object processing, block B-26 scans through the persistence bit array 36 and populates the mark bit array 32 accordingly. Block B-28 ends the deferred marking of persistent non-root objects ends.

After a non-persistent object root scan is performed in accordance with FIG. 9, the deferred marking of non-persistent root objects is performed in accordance with FIG. 11. This processing begins in block B-30. Block B-32 processes the mark stack 40 to mark all non-persistent non-root objects that are reachable from non-persistent root objects. As previously stated, all non-persistent objects are marked in the mark bit array 32 in conventional fashion. The deferred marking of non-persistent non-root objects ends in block B-34.

After the mark bit array 32 is filled out, conventional sweep processing may be carried out to reclaim chunks of memory from the heap 12. Following sweep processing, the heap 12 may be compacted using conventional compaction operations. During compaction, when the objects are moved from one location to another in the heap 12, a bit in the allocation bit array 34 for the corresponding new memory address is set. The old value is reset. Using the same method, the persistence bit array 36 is also changed when objects are moved during compaction.

The persistence bit array 36 is also modified as a result of application execution. This happens when an application adds a new object to a persistent object sub-tree or a persistent object reference is removed. When such persistent object references are modified it is necessary for the runtime environment 8 (or the application) to update the persistence bit array 36 to change the persistence bit of the object(s) being added/deleted. Also, the persistence bits of any sub-tree objects that are referenced from added/deleted objects must be changed. Sub-tree objects references may also be affected by explicit object reference modifications. A mechanism for handling sub-tree object persistence changes caused by object additions, deletions and modifications may use a technique similar to the write barriers used to dirty a card table in a Java concurrent garbage collector. In particular, a write barrier may be used to remember an object modification for subsequent sub-tree traversal by dirtying a card entry that corresponds to the object. Modifying the persistence level of the sub-tree can be done in a card cleaning phase performed concurrently with application execution or during the next garbage collection cycle.

Figure 12:
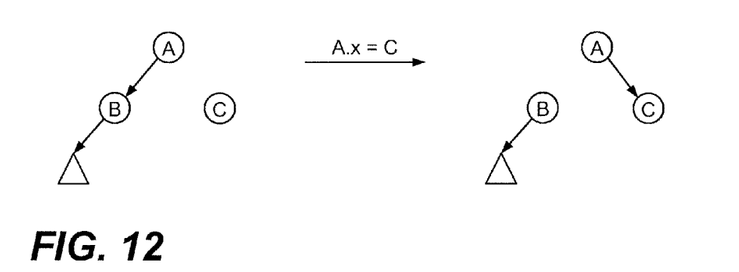
FIG. 12 is a functional block diagram showing a run-time object modification that changes a persistence level of a former sub-tree of the modified object.

An example of an object modification that impacts sub-tree object persistence level is depicted in FIG. 12. Initially, data member "x" of object "A" is referring to object "B," which in turn references an object sub-tree. It is assumed that object "A," object "B" and object "B's" sub-tree objects are already identified as persistent and appropriate persistence values have been set in the persistence bit array 36. At application run time, the data member "x" of object "A" is modified to point to a new object "C." This will decrease the persistence level of object "B" and the objects on its sub-tree. During the modification of object "A," the runtime environment 8 (or the application) can decrement object "B's" persistence level and increment object "C's" persistence level. A write barrier can also be executed to remember the modification to object "A" (by dirtying a card) so that object "B's" sub-tree can be subsequently traversed to decrement the persistence level of all its objects that were previously reachable from object "A." Note that runtime modifications such as setting a write barrier, card dirtying, and card cleaning, are conventionally performed as part of Java concurrent garbage collection. Thus, in a Java implementation of the garbage collector 10, the above-described activities for handling persistent object modifications could be combined with concurrent garbage collection (if used) to eliminate/reduce runtime overhead.

Example Hardware Environment

Figure 13:
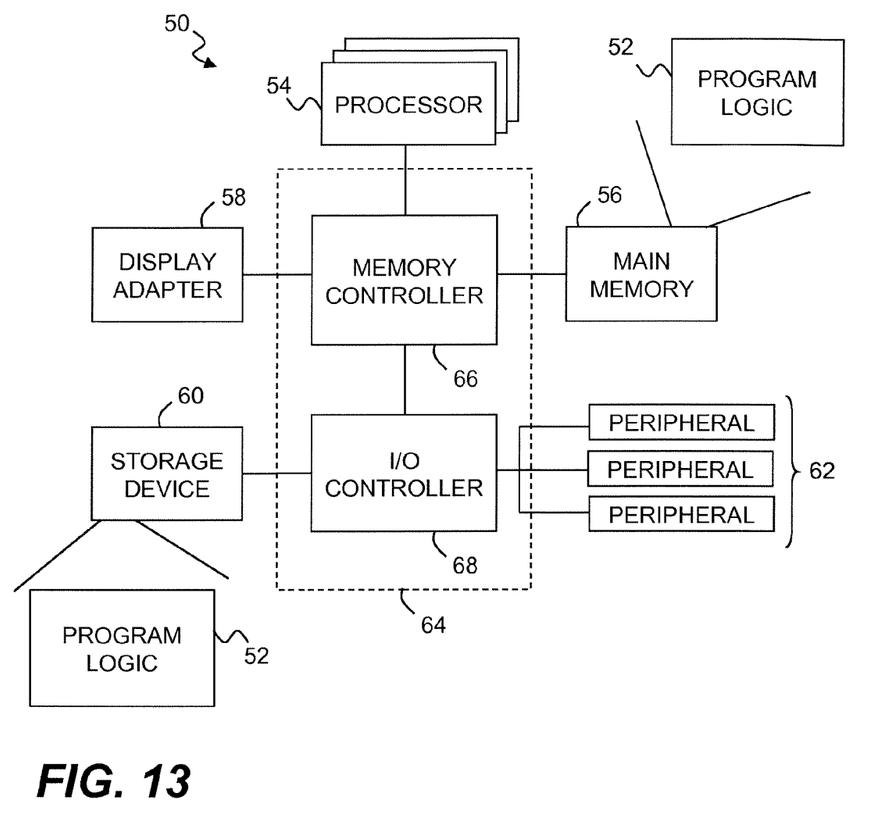
FIG. 13 is a functional block diagram showing example machine hardware that may be used to provide a data processing system in accordance with the present disclosure.

Turning now to FIG. 13, an example computing system 50 is shown that may be used to implement the runtime environment 8 and its garbage collector 10. The system 50 supports the execution of program logic 52 (comprising the runtime environment 8) that in turn controls the system 50 to perform various operations. According to one possible embodiment, the system 50 may include one or more processors 54 that operate in conjunction with a main memory 56. As used herein, the term "processors" includes, but is not necessarily limited to, single-threaded or multi-threaded CPUs (Central Processing Units) within single-core or multi-core processor devices (each core being considered a CPU) that are designed to execute program instruction logic, such as software or firmware. The processors 54 may comprise general purpose processors or they may be custom-designed to support the required functions. The memory 56 may comprise RAM (Random Access Memory), ROM (Read-Only Memory), combinations of RAM and ROM, or any other type of tangible storage medium capable of storing data in computer readable form. The processors 54 and the memory 56 may be situated within a single computing node (e.g., as part of a single-node SMP system) or they may be distributed over plural nodes (e.g., as part of a NUMA system or cluster). Other distributed topologies could also be employed. Conventional cache memories (not shown) may be respectively associated with the processors 54.

Additional components of the system 50 may include a display adapter 58 for generating visual output information (e.g., text and/or graphics) to a display device, a persistent storage device 60 (e.g., a disk drive, a flash memory, etc.), and various peripheral devices 62 that may include a keyboard or keypad input device, a pointer input device, a network interface card (NIC), a USB bus controller, a SCSI disk controller, etc. A bus or other communication infrastructure 64, which may include a memory controller hub or chip 66 (e.g., a northbridge) and an I/O (input/output) controller hub or chip 68 (e.g., a southbridge), may be used to interconnect the foregoing elements. It should be understood that the foregoing description is for purposes of illustration only, and that other components and arrangements may also be used to implement the internals of the system 50.

The system 50 may be implemented as a client or a server machine. In either case, the program logic 52 may be implemented in software, firmware or a combination thereof, and possibly with some operations being performed by hardware logic. If implemented in software, the program logic 52 may be loaded from the persistent storage 60 into a portion of the main memory 46 that comprises RAM. If implemented in firmware, the program logic 52 could reside in a portion of the main memory 56 that comprises ROM, such as EPROM memory. The program logic 52 may comprise a collection of program instructions, possibly having entry and exit points, written in a suitable programming language. Such programming languages include, but are not limited to, a high level procedural language such as C, a high level object oriented language such as C++, or a lower level language such as assembly. The program instructions written in such languages may be compiled or assembled (as the case may be) into machine language instructions that are capable of execution on the processors 54. When the machine language program instructions are loaded into and executed by the processors 54, the resultant programmed system 50 becomes a particular machine for practicing the example embodiment described herein. The program instructions of the program logic 52 may be embodied in one or more modules, each of which may be compiled and linked into an executable program, installed in a dynamically linked library, or otherwise made ready for invocation and execution by the system 50. The module(s) may be implemented to run with or without the support of an underlying operating system. The module(s) may also be written in an interpreted programming language such as BASIC, Perl, Python or Java and executed directly by an interpreter or compiled into byte code for execution by a virtual machine. It will be appreciated that the modules may be callable from other modules or from themselves, and/or may be invoked in response to detected events or interrupts. Moreover, although in some embodiments a module may be separately compiled, in other embodiments a module may represent a subset of instructions of a separately compiled program, and may not have an interface available to other logical program units.

As mentioned, some aspects of the program logic 52 could be implemented using dedicated logic hardware. Examples of such hardware would include connected logic units such as gates and flip-flops, and/or integrated devices, such as application specific integrated circuits (ASICs) and programmable gate arrays (e.g., field programmable gate arrays (FPGAs)) or processors.

Accordingly, a technique for handling persistent objects to reduce garbage collection pause times has been disclosed. It will be appreciated that the foregoing concepts may be variously embodied in any of a machine-implemented method, a computing system, and a computer program product in which programming logic is provided by one or more computer-readable storage media for use in controlling a computing system to perform the required functions. Example embodiments of a machine-implemented method have been described in connection with FIGS. 1-12. Example embodiments of a computing system have been described in connection with FIG. 13. With respect to a computer program product, digitally encoded program instructions may be stored on one or more computer-readable data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Example computer-readable storage media for storing such program instructions are shown by reference numerals 56 (memory) and 60 (storage device) of the system 50 of FIG.

Figure 14:
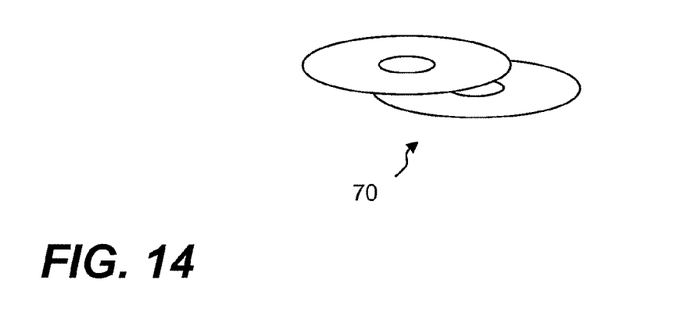
FIG. 14 is a diagrammatic illustration showing example computer-readable storage media that may be used to provide a computer program product in accordance with the present disclosure.

14. A further example of computer-readable storage media that may be used to store the program instructions is shown by reference numeral 70 in FIG. 14. The storage media 70 are illustrated as being portable optical storage disks of the type that are conventionally used for commercial software sales, such as compact disk-read only memory (CD-ROM) disks, compact disk—read/write (CD-R/W) disks, and digital versatile disks (DVDs). Such storage media can store the program instructions either alone or in conjunction with an operating system or other software product that incorporates the required functionality. The storage media could also be provided by other portable storage media (such as floppy disks, flash memory sticks, etc.), or storage media combined with drive systems (e.g. disk drives), or storage media incorporated in a computing system, such as random access memory (RAM), read-only memory (ROM) or other semiconductor or solid state memory. More broadly, the storage media could comprise any electronic, magnetic, optical, magneto-optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by a computing system, the resultant programmed system becomes a particular machine for practicing embodiments of the method(s) and system(s) described herein.

Although various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A machine-implemented method, comprising:
    initiating a garbage collection cycle on a set of objects that have been dynamically allocated in a memory;
    as part of said garbage collection cycle, identifying new persistent objects and reachable non-persistent objects while ignoring old persistent objects that have been identified as persistent in previous garbage collection cycles;
    as part of said garbage collection cycle, associating said new persistent objects as members of a set of persistent objects that includes said old persistent objects, and preserving persistence information for said set of persistent objects for use during subsequent garbage collection cycles; and
    as part of said garbage collection cycle, marking all reachable non-persistent objects and all persistent objects in said set of persistent objects for memory reclamation phase processing, said persistent objects being so marked using said preserved persistence information;
    wherein said identifying includes scanning call stack frames and identifying new persistent stack frames, non-persistent stack frames and old persistent stack frames based on stack frame age using an epoch count.

2. A method in accordance with claim 1, wherein said identifying further includes identifying new persistent root objects in said new persistent frames, identifying non-persistent root objects in said non-persistent frames, and performing no identification of root objects in said old persistent frames.

3. A method in accordance with claim 2, wherein said associating includes setting persistence count bits for said new persistent root objects and all persistent non-root sub-tree objects that are reachable therefrom in a persistence bit array containing said persistence information for said set of persistent objects.

4. A method in accordance with claim 3, wherein said marking includes populating a mark bit array with information from said persistence bit array so that said mark bit array reflects said set of persistent objects.

5. A method in accordance with claim 4, wherein said marking further includes completing said mark bit array by marking said non-persistent root objects and all non-persistent non-root sub-tree objects that are reachable therefrom in said mark bit array.

6. A method in accordance with claim 3, further including updating said persistence bit array to reflect runtime modifications to persistent objects.

7. A system, comprising:
    one or more processors;
    a memory coupled to said one or more processors, said memory including a computer useable medium tangibly embodying at least one program of instructions executable by said processor to perform operations, said operations comprising:
    initiating a garbage collection cycle on a set of objects that have been dynamically allocated in a memory;
    as part of said garbage collection cycle, identifying new persistent objects and reachable non-persistent objects while ignoring old persistent objects that have been identified as persistent in previous garbage collection cycles;
    as part of said garbage collection cycle, associating said new persistent objects as members of a set of persistent objects that includes said old persistent objects, and preserving persistence information for said set of persistent objects for use during subsequent garbage collection cycles; and
    as part of said garbage collection cycle, marking all reachable non-persistent objects and all persistent objects in said set of persistent objects for memory reclamation phase processing, said persistent objects being so marked using said preserved persistence information;
    wherein said identifying includes scanning call stack frames and identifying new persistent stack frames, non-persistent stack frames and old persistent stack frames based on stack frame age using an epoch count.

8. A system in accordance with claim 7, wherein said identifying further includes identifying new persistent root objects in said new persistent frames, identifying non-persistent root objects in said non-persistent frames, and performing no identification of root objects in said old persistent frames.

9. A system in accordance with claim 8, wherein said associating includes setting persistence count bits for said new persistent root objects and all persistent non-root sub-tree objects that are reachable therefrom in a persistence bit array containing said persistence information for said set of persistent objects.

10. A system in accordance with claim 9, wherein said marking includes populating a mark bit array with information from said persistence bit array so that said mark bit array reflects said set of persistent objects.

11. A system in accordance with claim 10, wherein said marking further includes completing said mark bit array by marking said non-persistent root objects and all non-persistent non-root sub-tree objects that are reachable therefrom in said mark bit array.

12. A system in accordance with claim 9, wherein said operations further comprise updating said persistence bit array to reflect runtime modifications to persistent objects.

13. A computer program product, comprising:
one or more non-transitory machine-readable storage media;
program instructions provided by said one or more media for programming a data processing platform to perform operations, said operations comprising:
initiating a garbage collection cycle on a set of objects that have been dynamically allocated in a memory;
as part of said garbage collection cycle, identifying new persistent objects and reachable non-persistent objects while ignoring old persistent objects that have been identified as persistent in previous garbage collection cycles;
as part of said garbage collection cycle, associating said new persistent objects as members of a set of persistent objects that includes said old persistent objects, and preserving persistence information for said set of persistent objects for use during subsequent garbage collection cycles; and
as part of said garbage collection cycle, marking all reachable non-persistent objects and all persistent objects in said set of persistent objects for memory reclamation phase processing, said persistent objects being so marked using said preserved persistence information;
wherein said identifying includes scanning call stack frames and identifying new persistent stack frames, non-persistent stack frames and old persistent stack frames based on stack frame age using an epoch count.

14. A computer program product in accordance with claim 13, wherein said identifying further includes identifying new persistent root objects in said new persistent frames, identifying non-persistent root objects in said non-persistent frames, and performing no identification of root objects in said old persistent frames.

15. A computer program product in accordance with claim 14, wherein said associating includes setting persistence count bits for said new persistent root objects and all persistent non-root sub-tree objects that are reachable therefrom in a persistence bit array containing said persistence information for said set of persistent objects.

16. A computer program product in accordance with claim 15, wherein said marking includes populating a mark bit array with information from said persistence bit array so that said mark bit array reflects said set of persistent objects.

17. A computer program product in accordance with claim 16, wherein said marking includes completing said mark bit array by marking said non-persistent root objects and all non-persistent non-root sub-tree objects that are reachable therefrom in said mark bit array.

* * * * *